(12) United States Patent
Floyd et al.

(10) Patent No.: US 8,257,559 B2
(45) Date of Patent: Sep. 4, 2012

(54) THERMAL BARRIER COATING RESISTANT TO PENETRATION BY ENVIRONMENTAL CONTAMINANTS

(75) Inventors: Margaret M. Floyd, Chandler, AZ (US);
Thomas Strangman, Prescott, AZ (US);
Derek Raybould, Denville, NJ (US);
Paul J. Mravcak, Simpsonville, SC (US)

(73) Assignee: Honeywell International Inc., Morristown, NJ (US)

( * ) Notice: Subject to any disclaimer, the term of this patent is extended or adjusted under 35 U.S.C. 154(b) by 1178 days.

(21) Appl. No.: 12/102,186

(22) Filed: Apr. 14, 2008

(65) Prior Publication Data
US 2009/0038935 A1 Feb. 12, 2009

Related U.S. Application Data

(62) Division of application No. 11/170,836, filed on Jun. 30, 2005, now Pat. No. 7,416,788.

(51) Int. Cl.
*C23C 14/06* (2006.01)
*C23C 14/34* (2006.01)

(52) U.S. Cl. ............. 204/192.1; 204/192.16; 427/596; 427/597

(58) Field of Classification Search ............. 204/192.1, 204/192.16; 427/596, 597
See application file for complete search history.

(56) References Cited

U.S. PATENT DOCUMENTS

| | | | |
|---|---|---|---|
| 4,676,994 A | 6/1987 | Demaray | |
| 5,169,674 A | 12/1992 | Miller | |
| 5,350,599 A | 9/1994 | Rigney et al. | |
| 5,817,372 A | 10/1998 | Zheng | |
| 5,871,820 A | 2/1999 | Hasz et al. | |
| 6,296,945 B1 * | 10/2001 | Subramanian | 428/469 |
| 6,465,090 B1 | 10/2002 | Stowell et al. | |
| 6,551,061 B2 | 4/2003 | Darolia et al. | |
| 6,599,568 B2 | 7/2003 | Lee et al. | |
| 6,610,419 B1 | 8/2003 | Stamm | |
| 6,627,323 B2 | 9/2003 | Nagaraj et al. | |
| 6,720,038 B2 | 4/2004 | Darolia et al. | |
| 6,730,413 B2 | 5/2004 | Schaeffer et al. | |
| 6,803,135 B2 * | 10/2004 | Liu et al. | 428/701 |
| 7,150,926 B2 | 12/2006 | Strangman | |

(Continued)

OTHER PUBLICATIONS

Singh, J. et al. "Tailored microstructure of zirconia and hafnia-based thermal barrier coatings with low thermal conductivity and high hemispherical reflectance by EB-PVD". Journal of Materials Science 39 (2004) 1975-1985.*

(Continued)

*Primary Examiner* — Bret Chen
(74) *Attorney, Agent, or Firm* — Ingrassia Fisher & Lorenz, P.C.

(57) ABSTRACT

A turbine engine component includes an electron beam-physical vapor deposition thermal barrier coating covering at least a portion of a substrate. The thermal barrier coating includes an inner layer having a columnar-grained microstructure with inter-columnar gap porosity. The inner layer includes a stabilized ceramic material. The thermal barrier coating also includes a substantially non-porous outer layer, covering the inner layer and including the stabilized ceramic material. The outer layer is deposited with continuous line-of-sight exposure to the vapor source under oxygen deficient conditions. The outer layer may further comprise a dopant oxide that is more readily reducible than the stabilized ceramic material. During deposition, the outer layer may also have an oxygen deficient stoichiometry with respect to the inner layer. Oxygen stoichiometry in the outer layer may be restored by exposure of the coated component to an oxidizing environment.

16 Claims, 2 Drawing Sheets

U.S. PATENT DOCUMENTS

| | | |
|---|---|---|
| 2003/0118874 A1* | 6/2003 | Murphy .................. 428/702 |
| 2003/0157363 A1* | 8/2003 | Rigney et al. ............ 428/680 |
| 2003/0207079 A1 | 11/2003 | Subramanian |
| 2004/0081760 A1 | 4/2004 | Burns et al. |
| 2004/0115410 A1 | 6/2004 | Nagaraj et al. |
| 2004/0115469 A1 | 6/2004 | Nagaraj et al. |
| 2004/0115470 A1 | 6/2004 | Ackerman et al. |
| 2004/0115471 A1 | 6/2004 | Nagaraj et al. |
| 2004/0157361 A1 | 8/2004 | Jiang |
| 2005/0013994 A1 | 1/2005 | Strangman |
| 2005/0036891 A1 | 2/2005 | Spitsberg et al. |
| 2006/0046090 A1* | 3/2006 | Spitsberg et al. ......... 428/689 |
| 2007/0184204 A1* | 8/2007 | Balagopal et al. ........ 427/419.2 |
| 2008/0107920 A1* | 5/2008 | Rowe et al. .............. 428/701 |
| 2008/0220177 A1* | 9/2008 | Hass et al. ............... 427/446 |

OTHER PUBLICATIONS

Cheng, J., et al., "Thermal/Residual Stress in an Electron Beam Physical Vapor Deposited Thermal Barrier Coating System". Acta mater. vol. 46, No. 16, pp. 5839-5850, 1998.*

Johnson, C.A., et al., "Relationships between residual stress, microstructure and mechanical properties of electron beam-physical vapor deposition thermal barrier coatings". Surface and Coatings Technology 108-109 (1998) 80-85.*

* cited by examiner

THERMAL BARRIER COATING RESISTANT TO PENETRATION BY ENVIRONMENTAL CONTAMINANTS

CROSS REFERENCE TO RELATED APPLICATION

This application is a divisional of Ser. No. 11/170,836 filed on Jun. 30, 2005.

TECHNICAL FIELD

The present invention relates to thermal barrier-coated turbine engine components that function in high temperature environments. More particularly, the present invention relates to coatings for turbine engine components to improve resistance to heat and contaminants that are commonly part of high-temperature combustion gas environments.

BACKGROUND

Turbine engines are used as the primary power source for various kinds of aircrafts. The engines are also auxiliary power sources that drive air compressors, hydraulic pumps, and industrial gas turbine (IGT) power generation. Further, the power from turbine engines is used for stationary power supplies such as backup electrical generators.

Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more air into the engine and the high velocity combustion gas is passed out of the gas turbine aft end to create forward thrust. Other engines use this power to operate one or more propellers, electrical generators, or other devices.

Many turbine engine and aeroengine components such as blades, guide vanes, combustor cans, and so forth are formed from a superalloy, and are often coated with a thermal barrier coating to extend the component life. Since a temperature gradient is produced across the thermal barrier coating during engine operation, the engine component functions at a reduced temperature with respect to the operating environment. In addition to providing a thermal barrier, if the coating material has a thermal expansion coefficient that differs from that of the underlying component material, the coating material typically is processed to have porosity that provides high in-plane compliance to accommodate a thermal expansion mismatch.

Both the protective properties and the in-plane compliance for the thermal barrier coating may be adversely affected if the engine component is exposed to some types of environmental contaminants. One class of contaminants that may potentially reduce a thermal barrier coating's protective and compliance characteristics includes dust, comprising oxides of calcium, magnesium, aluminum, silicon, and mixtures thereof, which are commonly referred to as CMAS. Another class of contaminants that can wick into porous thermal barrier coatings is molten sulfate salts, such as sodium sulfate, which is a constituent of sea salt. Molten CMAS and sulfate salts may penetrate the pores or channels in a thermal barrier coating. Upon cooling, the penetrated contaminates solidify and thereby reduce the coating's in-plane compliance. Cracking, fragmentation, and spalling in the thermal barrier coating may result from the reduced ability to tolerate compressive strain.

Hence, there is a need for a substrate coating that has thermal barrier properties, high in-plane compliance and is resistant to contamination and penetration from environmental contaminants such as CMAS that exist in a high temperature system. There is a further need for efficient methods for manufacturing a component that includes such a coating.

BRIEF SUMMARY

The present invention provides a turbine engine component, comprising a substrate, and a thermal barrier coating covering at least a portion of the substrate. The thermal barrier coating includes an inner layer having a columnar-grained microstructure with inter-columnar gap porosity. The inner layer includes a stabilized ceramic material. The thermal barrier coating also includes a substantially non-porous stabilized ceramic outer layer, covering the inner layer. The stabilized ceramic outer layer may comprise a dopant oxide that is more readily reducible than the stabilized ceramic material. The stabilized ceramic outer layer may also be deposited with an oxygen deficient stoichiometry with respect to the inner layer.

The present invention also provides a first method of protecting a turbine engine component from heat and environmental contaminants. The method includes the steps of depositing a thermal barrier coating inner layer, including a stabilized ceramic material having a columnar microstructure with inter-columnar gap porosity, onto at least a region of a component surface by rotating or otherwise intermittently positioning the component surface region requiring coating within the line-of-sight of an electron beam-physical vapor deposition vapor source, and subsequently depositing a substantially non-porous thermal barrier coating outer layer. The outer layer of the thermal barrier coating comprises a stabilized ceramic material which is deposited with an oxygen deficient stoichiometry. The outer layer of thermal barrier coating may further comprise a dopant oxide that is more readily reducible than the stabilized ceramic material. Surfaces requiring the dense layer of thermal barrier coating may be stationary or continuously exposed to deposition from the line-of-sight electron beam-physical vapor deposition vapor source. The outer layer of the thermal barrier coating is substantially free of interconnected porosity and has a higher density than the inner layer.

The present invention also provides a second method of protecting a turbine engine component from heat and environmental contaminants. The method comprises the steps of depositing a thermal barrier coating inner layer, comprising a stabilized ceramic material having a columnar microstructure with inter-columnar gap porosity, onto at least a region of a component surface, by depositing a ceramic material onto the substrate in a deposition chamber while bleeding oxygen into the deposition chamber, and forming a substantially non-porous thermal barrier coating outer layer onto the inner layer by depositing the ceramic material onto the inner layer without bleeding oxygen into the deposition chamber.

Other independent features and advantages of the preferred turbine engine component and protecting method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention includes a coating for a variety of substrates, including gas turbine and aeroengine components. The coating has both thermal barrier properties and high in-plane compliance. Further, the coating includes a thin densified outermost region that is resistant to penetration from environmental contaminants such as molten CMAS deposits and sulfate salts. The densified outermost region keeps contaminants from wicking into the coating and thereby reducing the coating's in-plane compliance. As a result, contaminants are initially kept on the coating outer surface, and can be removed by evaporation into the flowing combustion gases. For example, at high temperatures silica and alumina may react with water vapor that is present in combustion gases, and evaporate from the deposits as hydroxides.

Figure 1:
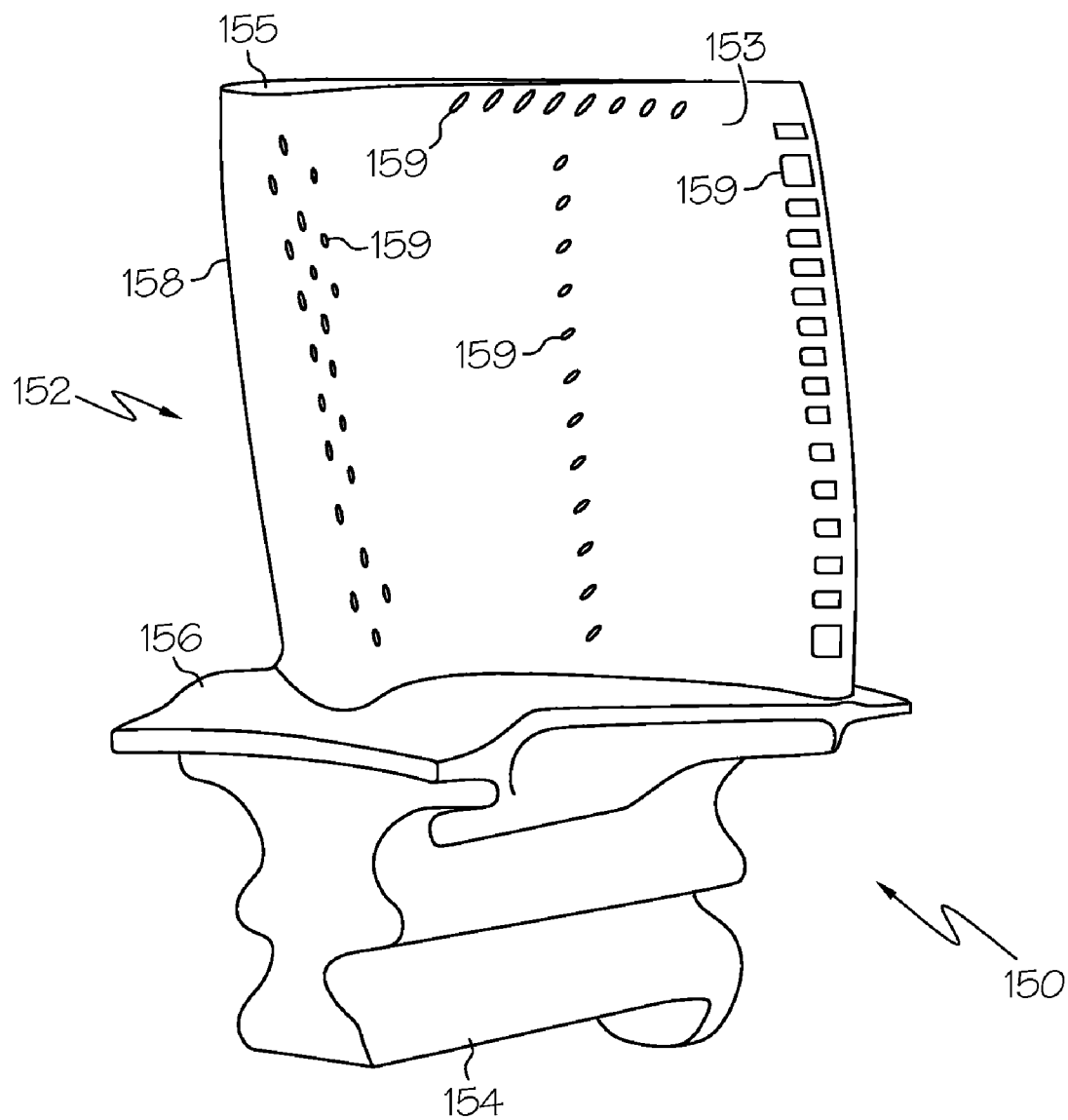
FIG. 1 is a perspective view of a blade that is exemplary of the types that are used in turbine engines.

FIG. 1 illustrates a superalloy blade 150 that is exemplary of the types that are used in turbine engines, although turbine blades commonly have different shapes, dimensions and sizes depending on gas turbine engine models and applications. Nickel-based superalloys are just one class of materials that are commonly used to manufacture turbine engine blades. The illustrated blade 150 has an airfoil portion 152 including a pressure surface 153, an attachment or root portion 154, a leading edge 158 including a blade tip 155, and a platform 156. The blade 150 may be formed with a non-illustrated outer shroud attached to the tip 155. The blade 150 may have non-illustrated internal air-cooling passages that remove heat from the turbine airfoil. After the internal air has absorbed heat from the superalloy, the air is discharged into the combustion gas flowpath through passages 159 in the airfoil wall.

As mentioned previously, the densified thermal barrier coating of the present invention can be tailored to fit a blade's specific needs, which depend in part on the blade component where degradation may occur. For example, the densified layer of the thermal barrier coating may be selectively applied to blade surfaces that are potentially exposed to deposition of environmental contaminants. In another exemplary embodiment, the densified layer of the thermal barrier coating is thicker at particular locations that are most likely to be aerodynamically impacted by CMAS dust particles. For example, during turbine engine operation particulate contaminants, such as CMAS particles, preferentially deposit on the leading edge 158 and the airfoil pressure surface 153 of turbine blade 150. The densified thermal barrier coating layer may be applied solely or primarily to these blade areas where deposits are anticipated. On blade areas where molten contaminant deposits will not be formed, the porous inner layer of the TBC is viable by itself without an overlying dense layer.

It is also emphasized again that turbine blades are just one example of the type of turbine components to which the densified thermal barrier coating of the present invention may be applied. Vanes, shrouds, and other turbine components can be coated in the same manner.

Figure 2:
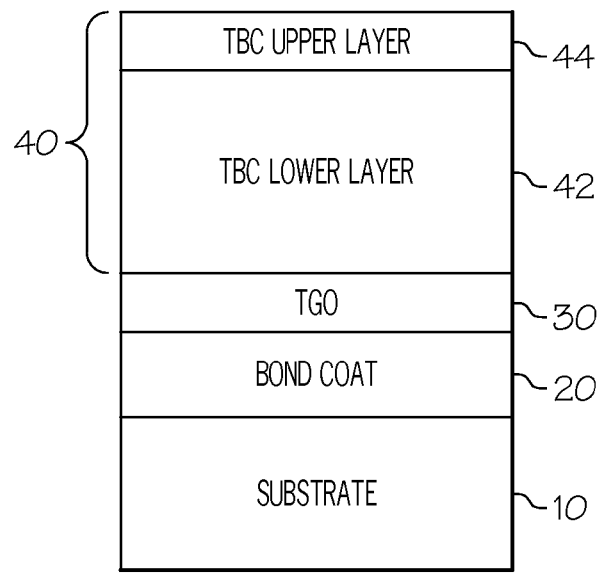
FIG. 2 is a cross-sectional view of a substrate coated with a densified thermal barrier coating, illustrating the architecture of an exemplary coating system according to an embodiment of the present invention.

Turning now to FIG. 2, a cross-sectional view of a substrate 10 coated with an exemplary densified thermal barrier coating 40 is illustrated. The thermal barrier coating 40 overlies the substrate 10 and any intermediate layers, and is formed of a ceramic material. In the context of a turbine engine airfoil, the thermal barrier coating 40 insulates the substrate 10 from the high temperature exhaust gas passing over the airfoil surface during engine operation. The thermal barrier coating 40 is a two-layer structure that includes an inner layer 42, and a much thinner outer layer 44. The inner layer 42 may be any acceptable material, and an exemplary material has a columnar-grained structure. The columnar-grained structure is porous having side-by-side columns that grow substantially perpendicular to the substrate surface and any intermediate layers. The columns are spaced apart to some degree, and the columns themselves are somewhat porous. The spaces and pores reduce the effects of stresses and strains induced when the protected article is repeatedly heated and cooled during service. Exemplary materials for the inner layer 42 include stabilized tetragonal and cubic zirconia and stabilized tetragonal and cubic hafnia, and mixtures thereof. A preferred example is about 7 weight % yttria-stabilized tetragonal zirconia.

The inner layer 42 can also be formed as a columnar-grained structured nanolaminate. For example, U.S. Pat. No. 6,482,537, which is incorporated herein by reference, discloses a thermal barrier coating that includes a columnar grained ceramic layer applied to an aluminide or MCrAlY bond coat by an electron beam-physical vapor deposition process. The ceramic layer includes a plurality of layers of stabilized zirconia, with the interfaces between the layers decorated with a secondary ceramic constituent, which includes particles selected from the group consisting of tantala and alumina. The multilayered ceramic coating includes at least 85% yttria stabilized zirconia, and between 1 and 15% secondary constituent.

Because the thermal barrier coating inner layer 42 is porous and includes spaces between the column structures, the inner layer 42 is somewhat vulnerable to attack by molten environmental contaminants such as CMAS, which may wick into the microstructure. To protect the inner layer 42 from penetration by molten contaminants, the outer layer 44 of the thermal barrier coating is a densified oxide layer. The outer layer may be simply a modification of the inner layer 42 in terms of structure, and does not exhibit the porosity of the inner layer 42. The outer and inner layers may have essentially the same chemical makeup. In other words, the outer layer 44 may be formed using the same compounds as the inner layer 42, only using a process that creates a dense material when compared with the porous columnar inner layer 42. The outer layer 44 may also be doped with additional oxide constituents that are more readily reduced than the stabilized ceramic material, or with an oxide that enhances diffusion. The concentration of the oxide dopants in the outer layer 44 ranges between about 0.5% and about 20%, and such oxides are in addition to the yttria or other stabilizing oxide. Exemplary oxide constituents include tantala, niobia, and alumina, which enhance surface diffusion and densification of the thermal barrier coating.

The thermal barrier coating outer layer 44 is very thin with respect to the inner layer 42. In an exemplary embodiment, the thickness of the columnar inner layer 42 is between about 1 and about 10 mils (about 25 to about 250 μm), while the dense outer layer 44 is less than about 1 mil (about 25 μm), and preferably no greater than 0.2 mils (about 5 μm) in thickness. Also, the outer layer 44 is substantially free of interconnected porosity that could wick molten CMAS or sulfate salt deposits into the thicker compliant thermal barrier coating layer 42.

In the exemplary structure illustrated in FIG. 2, a thermally-grown oxide layer 30 and a bond coat 20 are formed on the substrate 10 and underlie the thermal barrier coating 40. The bond coat 20 is formed on the nickel- or cobalt-based superalloy substrate, and can therefore react with available oxygen to form the thermally-grown oxide layer 30. Exemplary bond coat materials include an oxidation resistant alloy such as MCrAlY, wherein M is cobalt and/or nickel, or an oxidation resistant intermetallic, such as diffusion aluminide, platinum aluminide, an active element-modified aluminide, and combinations of the same. An exemplary bond coat 20 ranges in thickness between about 1 and about 6 mils (between about 25 and about 150 μm). The thermally-grown oxide layer 30 is grown from the aluminum in the above-mentioned bond coat materials, and is ideally less than 2 μm thick.

Figure 3:
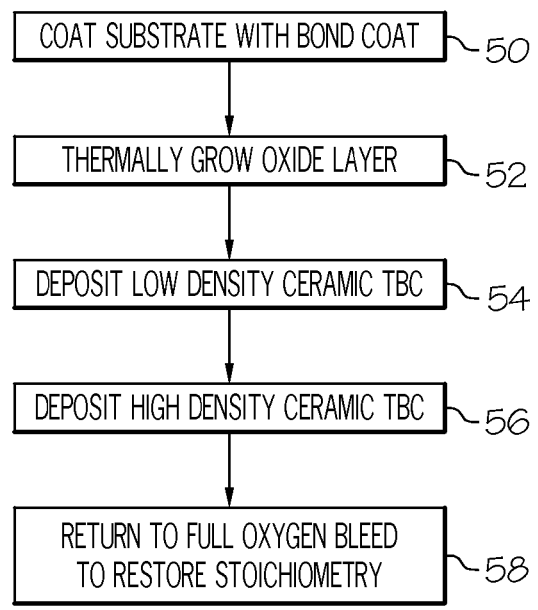
FIG. 3 is a flow chart illustrating production steps for coating a substrate with a densified thermal barrier coating according to an embodiment of the present invention.

Having described the general structure of a thermal barrier coating and exemplary underlying coating layers, FIG. 3 outlines a coating production method. As mentioned previously, in some cases it may be advantageous to include a bond coat over the substrate 10 and underlying the thermal barrier coating 40. If a bond coat is to be included in the coating structure, step 50 comprises coating the substrate with a suitable metal material to form the bond coat 20. Then, step 52 comprises growing an oxide layer 30 over the exposed bond coat region. Growing the oxide layer 30 can be performed by heating the substrate 10 and the bond coat 20 in the presence of oxygen. The oxide layer 30 may nucleate and grow during thermal barrier coating deposition when oxygen is present. For example, an aluminum oxide layer 30 will form when the articles are maintained between about 950° C. and about 1150° C. during the coating deposition, with the oxygen pressure ranging between about 0.0001 and about 0.02 Torr.

Step 54 comprises depositing the ceramic thermal barrier coating inner layer 42. A physical vapor deposition process may be used to form a columnar, porous ceramic structure. An exemplary physical vapor deposition process for depositing the outer and inner layers 44, 42 is electron beam-physical vapor deposition. Furthermore, if the article including the substrate 10 with the bond coat 20 formed thereon is transferred into a physical vapor deposition chamber, the thermal growth oxide 30 and the entire thermal barrier coating 40 can be formed inside the chamber without moving the article out of or into the chamber again.

The thermal barrier coating inner layer 42 is grown by mounting the article onto a rotating stage in a deposition chamber that includes a deposition source. The rotating stage supports the substrate above the coating vapor source. As the article rotates, ceramic material is deposited onto the substrate surface. More particularly, the surface area that is in the line of sight of the coating vapor source receives the ceramic material. Deposition on a surface area is interrupted when that area is rotated out of the line-of-sight. Tips of individual columnar grains of a stabilized zirconia or hafnia coating 42 are typically slanted or pointed due to growth on crystallographic planes. Deposition shadows exist between adjacent grain tips when the line-of-sight vapor is deposited at very low angles with respect to the component surface; for example, deposition shadows between grain tips are formed when coating begins and stops during each rotation of the substrate over the electron beam-physical vapor source. Shadowed deposition and associated porosity result in sub-micron thickness intercolumnar gaps between the growing columnar grains. Consequently, rotation of the substrate over the vapor source cause the inner layer 42 to have a columnar-grained microstructure with intercolumnar gap porosity, which provides a mechanism for strain accommodation in thick coatings.

An exemplary method for growing the thermal barrier coating inner layer 42 includes bleeding an oxygen stream into the vacuum coating chamber while rotating the article and performing the deposition process. The presence of oxygen in the chamber during deposition of the thermal barrier coating enhances the oxygen stoichiometry of the inner layer 42, minimizes metallic atom mobility during deposition, and increases the width of the submicron-thickness intercolumnar gaps between the columnar grains.

Step 56 comprises depositing the thermal barrier coating outer layer 44, which is a higher density layer with respect to the thermal barrier coating inner layer 42. An exemplary method for forming the high density outer layer 44 includes halting rotation of the article so that surfaces requiring the dense thermal barrier coating surface layer 42 have uninterrupted line-of-sight to the vapor source during deposition. Halting substrate rotation effectively removes the periodic deposition shadow that promotes formation of intercolumnar porosity. Further, halting substrate rotation increases radiant heating of the surfaces exposed to the vapor source, which increases oxide molecule and metallic atom mobility, which in turn promotes closure of the intercolumnar gaps between grains.

Density is also increased by setting the oxygen bleed pressure to less than 0.0001 torr while halting rotation of the article. Since ceramics such as zirconia and hafnia partially decompose during electron beam evaporation, the deposited coating will be oxygen deficient when the oxygen bleed is turned off. Metallic zirconium atoms diffuse faster than zirconium oxide molecules and promote closure of intercolumnar gaps. Secondary oxides such as tantala and niobia, which are less stable in vacuum than zirconia, further enhance surface diffusion and associated closure of intercolumnar gaps. Alumina, which has a metastable crystal structure during deposition, may also enhance surface diffusion until it crystallizes into the stable alpha phase or reacts with a stabilizing oxide, such as yttria, to form particles of yttrium aluminum garnet. The resulting dense outer layer 44 protects the underlying porous thermal barrier coating layer 42 from penetration by contaminants such as CMAS.

The oxygen bleed can be set to zero with or without rotation of the article on which the outer layer 44 is being deposited. When oxygen deficient deposition results in sufficient molecular and atomic mobility to densify the outer layer 44, halting substrate rotation is optional.

In one exemplary embodiment, the outer layer 44 includes the same chemicals as the inner layer, but has a denser overall structure. In one exemplary embodiment, the concentration of the oxide dopants in the outer layer 44 ranges between about 0.5% and about 20%, and the oxide dopant concentration in the outer layer 44 is the same as in the inner layer 42. In another exemplary embodiment, the denser outer layer 44 includes an increased concentration of a dopant such as tantala, niobia or alumina, with respect to the inner layer 42, to enhance surface diffusion and densification.

Before removing the article from the deposition apparatus, step 58 comprises resuming the oxygen bleed for a predetermined time period to restore the oxygen stoichiometry of the outer layer 44. Oxidation of the oxygen deficient surface layer 44 causes a small volumetric expansion in an outermost region of the outer layer 44, further closing and sealing any intercolumnar gaps in the outer layer 44. This final oxidation step 58 may also be performed in a post-coating heat treatment or during engine service.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of protecting a turbine engine component from heat and environmental contaminants, comprising the steps of:
depositing a thermal barrier coating inner layer, comprising a stabilized ceramic material having a columnar microstructure with inter-columnar gap porosity, onto at least a predetermined region of a component surface by intermittently positioning the predetermined component surface region within the line-of-sight of an electron beam physical vapor deposition vapor source; and
depositing a substantially non-porous thermal barrier coating outer layer, comprising the stabilized ceramic material and a dopant oxide that is more readily reducible than the stabilized ceramic material, onto at least a predetermined region of the inner layer by continuously positioning the predetermined inner layer region within the line-of-sight of the electron beam-physical vapor deposition vapor source, the outer layer being substantially free of interconnected porosity and having a higher density and a deficient oxygen stoichiometry with respect to the inner layer.

2. The method of claim 1, wherein the thermal barrier coating inner layer is formed by rotating the component and thereby rotating the predetermined component surface region into and out of the line-of-sight of the electron beam-physical vapor deposition vapor source, and the thermal barrier coating outer layer is formed by halting rotation of the component with the predetermined outer layer region within the line-of-sight of the electron beam-physical vapor deposition vapor source.

3. The method of claim 1, wherein the thermal barrier coating inner layer comprises the dopant oxide at a lower concentration than in the thermal barrier coating outer layer.

4. The method of claim 1, wherein the dopant oxide has a concentration in the outer layer ranging between about 0.5 and about 20 weight %, and is selected from the group consisting of tantala, niobia, and alumina.

5. The method of claim 1, wherein the thermal barrier coating outer layer is less than about 1 mil in thickness.

6. The method of claim 1, wherein the thermal barrier coating outer layer is no greater than about 0.2 mil in thickness.

7. The method of claim 1, wherein the stabilized ceramic material in both the thermal barrier coating inner and outer layers comprise a material selected from the group consisting of oxide-stabilized tetragonal and cubic zirconia, oxide-stabilized tetragonal and cubic hafnia, and mixtures thereof.

8. The method of claim 1, wherein the step of forming the thermal barrier coating inner layer is performed while bleeding oxygen into the deposition chamber, and the step of forming the thermal barrier coating outer layer is performed at a deposition chamber oxygen pressure less than about 0.0001 torr.

9. The method of claim 8, further comprising the step of:
exposing the component to an oxidizing environment that eliminates the oxygen deficiency in the thermal barrier coating outer layer.

10. A method of protecting a turbine engine component from heat and environmental contaminants, comprising the steps of:
depositing a thermal barrier coating inner layer, comprising a stabilized ceramic material having a columnar microstructure with inter-columnar gap porosity, onto at least a region of a component surface, by depositing a ceramic material onto the substrate in an electron beam-physical vapor deposition chamber while bleeding oxygen into the deposition chamber; and
forming a substantially non-porous thermal barrier coating outer layer onto the inner layer by depositing the ceramic material onto the inner layer without bleeding oxygen into the deposition chamber, so that the oxygen pressure during deposition of the inner layer is less than about 0.0001 torr.

11. The method of claim 10, wherein the thermal barrier coating outer layer further comprises a dopant oxide.

12. The method of claim 11, wherein the thermal barrier coating inner layer comprises the dopant oxide at a lower concentration than in the thermal barrier coating outer layer.

13. The method of claim 11, wherein the dopant oxide has a concentration in the outer layer ranging between about 0.5 and about 20 weight %, and is selected from the group consisting of tantala, niobia, and alumina.

14. The method of claim 10, wherein the thermal barrier coating outer layer is less than about 1 mil in thickness.

15. The method of claim 10, wherein the thermal barrier coating outer layer is no greater than about 0.2 mil in thickness.

16. The method of claim 10, wherein the stabilized ceramic material in both the thermal barrier coating inner and outer layers comprises a material selected from the group consisting of oxide-stabilized tetragonal and cubic zirconia, oxide-stabilized tetragonal and cubic hafnia, and mixtures thereof.

* * * * *